United States Patent [19]

Hurst

[11] Patent Number: 4,539,262
[45] Date of Patent: Sep. 3, 1985

[54] INSULATING MATERIAL

[75] Inventor: John Hurst, London, England

[73] Assignee: W. R. Grace Limited, London, England

[21] Appl. No.: 459,546

[22] Filed: Jan. 20, 1983

[30] Foreign Application Priority Data

Feb. 9, 1982 [GB] United Kingdom ............... 8203674

[51] Int. Cl.³ .................... B05D 7/00; B32B 5/16; B32B 9/00; B32B 11/00
[52] U.S. Cl. .................... 428/407; 427/222; 428/489; 521/57
[58] Field of Search .............. 427/222; 428/403, 407, 428/489; 521/57

[56] References Cited

FOREIGN PATENT DOCUMENTS 840663 7/1960 United Kingdom .
903250 8/1962 United Kingdom .
908942 10/1962 United Kingdom .
1344235 1/1974 United Kingdom .
1393732 5/1975 United Kingdom .
1592096 7/1981 United Kingdom .

Primary Examiner—Michael R. Lusignan
Attorney, Agent, or Firm—John J. Wasatonic; William L. Baker

[57] ABSTRACT

An insulating material in the form of a body comprising expanded plastics beads which are each encapsulated in bitumen or a bituminous compound which is free from solvents, light oils, emulsifiers or other liquifying agents, such encapsulation having been formed by a hot process, the encapsulated beads having been subsequently pressed together and distorted to form a body with voids between the beads substantially eliminated.

22 Claims, 2 Drawing Figures

INSULATING MATERIAL

DESCRIPTION

The present invention relates to an insulating material comprising expanded plastics beads which are each completely encapsulated in bitumen or a bituminous compound, and to a method of manufacture thereof.

Materials are in principle known, for instance from British Patent Specification No. 1,592,096, which comprise expanded polystyrene beads covered with bitumen of low softening point, together with an emulsifier. Also proposed have been materials according to British Patent Specification No. 1,344,235 where again an emulsified bitumen is used to coat expanded polystyrene beads in a volume ratio of about 1 to 6.

According to the present invention there is provided an insulating material comprising expanded plastics beads which are each encapsulated in bitumen or a bituminous compound which is free from solvents, light oils, emulsifiers or other liquifying agents, such encapsulation having been formed with the bitumen or compound in liquid form in a hot process.

The present invention also provides an insulating material in the form of a body comprising expanded plastics beads which are each encapsulated in bitumen or a bituminous compound which is free from solvents, light oils, emulsifiers or other liquifying agents, such encapsulation having been formed with the bitumen or compound in liquid form in a hot process, the encapsulated beads having been subsequently pressed together and distorted to form a body with voids between the beads substantially eliminated.

Further, the present invention provides a method of making an insulating material by heating bitumen or a bituminous compound which is free from solvents, light oils, emulsifiers or other liquifying agents to a temperature appreciably above its softening point in order to make it liquid and free running and processing expanded plastics beads therewith so as to completely encapsulate each of the beads.

The present invention also provides a method of making an insulating material body by heating bitumen or a bituminous compound which is free from solvents, light oils, emulsifiers or other liquifying agents to a temperature appreciably above its softening point in order to make it liquid and free running and processing expanded plastics beads therewith so as to completely encapsulate each of the beads, and, while the encapsulating bituminous material is in a semi-liquid state, pressing the beads together and distorting them so as substantially to eliminate voids between the beads.

By a semi-liquid state we mean that the bitumen or compound is hot enough to be tacky but not hot enough to be runny.

One consequence of the feature of the invention that the bitumen or bituminous compound applied to the beads is free from solvents, light oils, emulsifiers and the like is that the coating can be waterproof. For instance, if an emulsifier is used, there is a risk that in the presence of water the emulsion will revert back to the liquid phase and thus not provide a waterproof coating. A problem with using solvents for bitumen, of course, is that they tend also to be solvents for expanded plastics beads, and this is also avoided with the present invention where the encapsulation of the individual beads is of better continuity and water tightness, and the material, whether in the form of beads or of a body, is therefore useful in situations where water or damp may occur without the beads taking up the moisture.

In addition, insofar as the prior art has contemplated the use of expanded polystyrene beads covered with low softening point bitumen, these suffer from the major disadvantage that the presence of hot sunshine or elevated temperature will soften the bitumen and any assembly of such coated beads will lose its cohesive strength.

Particularly useful results can be achieved if the bitumen or bituminous compound used has a softening point significantly greater than the melting point of the beads, e.g. by 10° to 20° C. or more, and if it is solid at ambient temperature so that after encapsulation cooled beads can readily be separated and remain separated without mutual adherence.

Preferably the plastics beads are of polystyrene, preferably in the form of expanded polystyrene spheres, in which case they have a melting point of about 95° to 100° C. The bituminous compound is preferably an asphalt and preferably has a softening point of at least 115° C. (Institute of Petroleum Needle Method). In one preferred embodiment the asphalt is heated to 185° C. during the encapsulation process. Preferably the bitumen or bituminous compound has a penetration value of 1 to 6, preferably 1 to 4, at a conditioned temperature of 25° C.

When the insulating material is in the form of a body it may have a continuous hard and smooth surface. This can be achieved by the step of applying a heated surface over all surfaces of the body, which will generally be in the form of a board.

The step of pressing the encapsulated beads together to form a body can be performed between moving endless belts, on a table using a reciprocating roller, by passing the material on a moving belt beneath a roller or by simple compression. Preferably, however, the beads are cooled after encapsulation, separated from each other, and reheated when pressed together so that the encapsulating material becomes sticky or tacky, but not runny. It is also possible for satisfactory results to be obtained when the beads are further expanded, or re-expanded, while being pressed together so as to be urged against one another and interlock with and have substantially straight edges between one another. Preferably such further or re-expansion is brought about by the injection amongst the beads of superheated steam at between 150° C. and 180° C. As an indication of appropriate further expansion, which can be due to pentane or other gases retained within the beads, it can be mentioned that in a preferred case the initial volume ratio of beads to bitumen is between 25 and 30 to 1 and the final volume ratio is approximately 40 to 1. Preferably the beads pass in a covergent run between endless belts, while expanding outwards towards the belts. This arrangement has the advantage of improving uniformity of bead size in the finished product, and excluding voids thus making the body more strong both flexurally and in compression. If mere external compression were relied on, beads near the surface would tend to be squashed, while those near the middle would not be to such an extent, so a weaker product would result. The use of hot steam and the material becoming tacky in the present invention aids adhesion when the bitumen cools.

It is possible and preferred to obtain bodies according to the invention with flexural strength of 30–45 psi (2.10–3.15 kg/cm$^2$) measured according to B.S. 4370 and compression strength of 15–25 psi (1.05–1.75 kg/cm²) at 25° C. and 20% compression.

A preferred feature of the invention concerns the proportions of bitumen or bituminous compound to beads. Preferably, at the mixing stage, the volume of beads is at least 20 times the volume of bitumen or compound, and while the ratio can extend from 20 to 1 up to at least 50 to 1, a preferred range is 25 to 40 to 1. As a result, the volume to weight ratio of the product, whether in the form of a body or in the form of individual encapsulated beads, is high, which is clearly most acceptable in an insulating material where the insulating effect increases with volume. The weight ratio is preferably approximately one part by weight of beads to one-and-a-half parts by weight of bitumen or bituminous material.

In order to ensure that all beads are, so far as possible, encapsulated with bitumen or compound it is also preferred to keep the aggregate surface area of the beads relatively low. This can be done by using beads of not less than a certain size, preferably 2 mm, and by ensuring that the beads do not include "fines", the presence of which would greatly increase surface area with negligible increase in volume. Thus it is preferred that the diameter of the smallest beads is not less than one fifth, and generally not less than one half of the diameter of the largest beads, while most advantageously the beads are of substantially uniform size. Thus beads of from 2 to 10, preferably 3 to 6 mm in diameter are preferred. There are particular advantages in uniformity and strength of end product if the size distribution of the beads is kept small.

In the case of bodies according to the invention which are boards, desirable thicknesses are between 3 to 10 cm, typically 5 cm and in other dimensions the board size can be selected as desired but it is envisaged that boards of say 60×120 cm will prove particularly useful for ease of manufacture, storage, handling and installation.

It is, of course, very surprising that in the method of the invention beads can be successfully encapsulated by bituminous compound, which is hotter than the melting point of the beads. Such, however, is the case. Initially, before encapsulation, the beads will tend to be coherent due to static charges built up on them but it has been found that when they are added to the hot bitumen the bitumen immediately forms itself into a thin coating all around and on each bead. The beads will not individually accept more than this minimum coating, which provides complete encapsulation, and excess bitumen is passed from one bead to another in a remarkable way. Thus, on the addition of the beads to the mixer containing hot bitumen, the bitumen spreads itself in a most unexpected way so as entirely to encapsulate each bead with bitumen or compound. In a short time all beads are encapsulated, i.e. entirely covered with bitumen. The result of this is that the static forces initially holding the beads together are destroyed although thereafter the bitumen tends to hold the beads together, after cooling, or at least initial cooling, occurs in the mixer.

The invention extends to the beads encapsulated with the bitumen or compound in loose form. On discharge from the mixer any adherence caused by the bitumen or compound can be removed by a gentle vibratory operation. The result is an aggregate of waterproofed, exceedingly light and buoyant insulating beads which are useful in situations where buoyancy is desired because the beads cannot absorb water even after prolonged immersion. In certain insulating applications, for instance in filling cavities with insulating material, such beads may be exceedingly useful.

In embodiments comprising bodies such as boards the cooled mix, or the mix while cooling, is removed from the mixer and then as previously described pressed to such an extent that voids between the beads are substantially removed, i.e. the beads deform but their volume will not be substantially changed, and indeed is preferably increased due to additional heating and blowing. Compression of a heap of loose beads to about ⅔ thickness is normally sufficient, though greater compression increases the possibility of absolutely all voids being removed. One object of the pressing step is that there should be no path through the board formed by interconnected voids. This permits maximum board thickness, and thus the maximum insulating effect, for a given weight of material. Another object is that the beads should so press one upon its neighbours that they become distorted and interlocked, contacting one another along straight lines as the material is viewed in section. This confers high flexural and compressive strength to the resultant board. Thus, when this is done the resulting board is waterproof, substantially void free and in fact a structure of considerable strength and very little weight. The boards and bodies can if desired be further improved by the surface treatment previously described, which is in effect an "ironing" treatment whereby a heated surface is passed all over each surface of the board. This softens the bitumen, and to some extent melts beads which are on the surface and the result is a hard, durable, smooth, handleable and abrasion resistant surface which increases the waterproofness and surface hardness of the panels and ensures that each always remains individually sealed.

Bodies of the invention, by reason of the very small quantities of bitumen or bituminous compound used, remain exceedingly light but are nevertheless robust and offer excellent insulating possibilities. At least some of the possible applications of the bodies and boards will be obvious, for instance in building, in roofing or walls where a heat insulating function is obtained in a most convenient and consistent way. Because they can be factory produced quite easily, and are convenient for stacking and handling they will be exceedingly easy and cheap to transport and to install accurately.

In order that the invention may be more clearly understood the following description is given by way of example only with reference to the accompanying drawings, in which.

Figure 1:
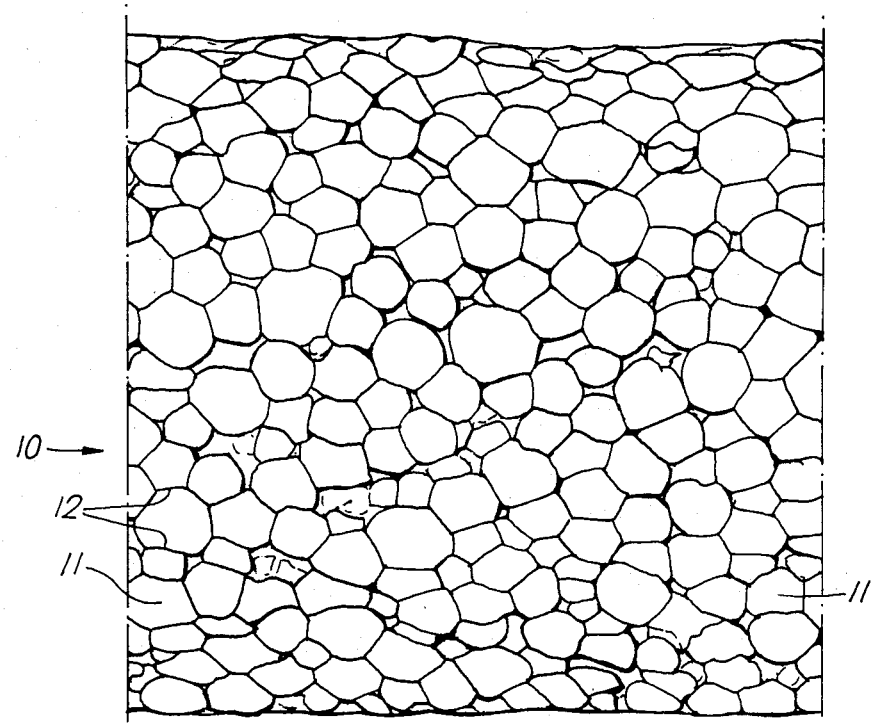
FIG. 1 is an illustration of a cross section of a sample of solid material according to the invention.

Shown in FIG. 1 is a drawing to full scale of a cross section cut through a sample of material 10 according to the invention. The white areas such as 11 represent beads and the black lines bounding them are the asphaltic encapsulating coating 12. Attention is particularly directed to the fact that there is notable uniformity of bead size through the section, that is to say the beads are not noticeably smaller near the edges than they are in the middle. This is brought about by heating and further or re-expansion of the encapsulated beads in the body forming step. Another feature to be noted is the absence of voids between the beads. This uniformity leads to relatively low bead surface area which means that a minimum of bituminous material is required in order to provide a satisfactory waterproofing encapsulation of each bead, and adhesion of the beads to each other.

Figure 2:
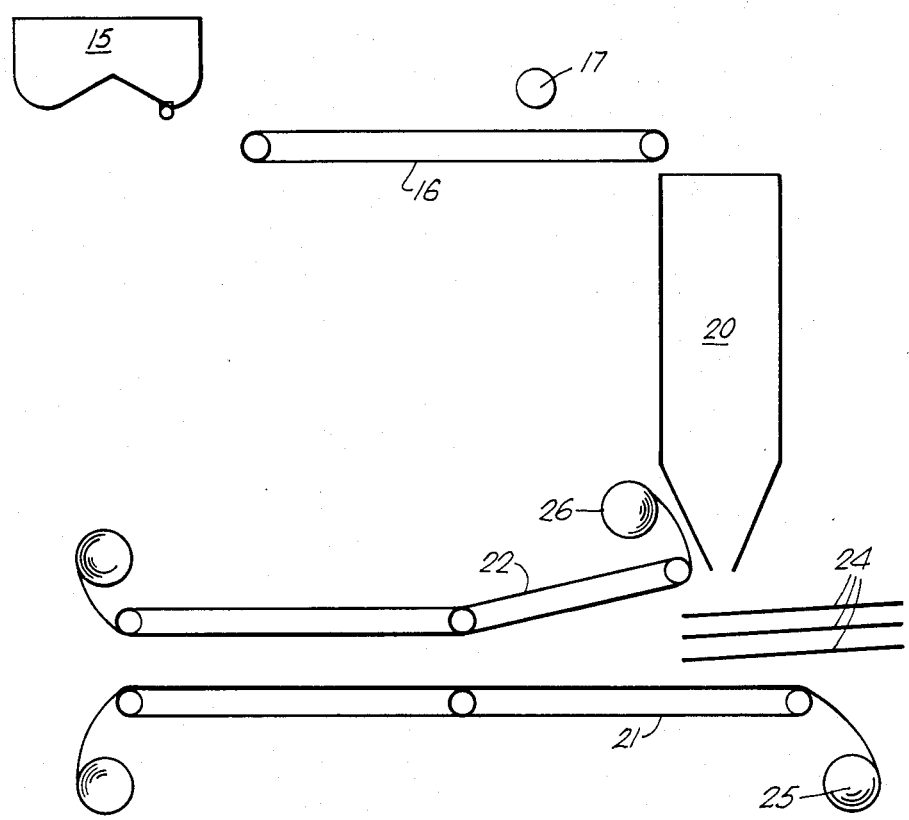
FIG. 2 is a schematic view of apparatus used in performing the method of the invention in making a solid insulating material according to the invention.

As shown in FIG. 2 the plastics beads are initially deposited in a mixer 15 which already contains bitumen or bituminous compound in softened form, preferably asphalt at 185° C., so that the compound fully encapsulates all beads. The beads are partially cooled, tipped onto a conveyor 16 for further cooling, passed under a roller 17 to separate them and make them discrete, and then fed to a hopper. At this point the encapsulated beads constitute a material according to the invention. From the hopper the beads are fed at a controlled rate onto the lower of two endless belts 21. An upper belt is shown at 22. The belts 21, 22 converge over a first part of their run and then extend parallel to one another. Extending into the space between the belts are tubes 24 to convey superheated steam to the region of the beads. Due to pentane or other gases retained in the beads, these will expand further when heated, ensuring that pressure exists within the material throughout its thickness as it is formed, and not merely near its edges due to the convergence of the belts. Shown at 25 and 26 are supply rolls of plastics sheet to cover the endless belts 21 and 22 and corresponding take-up rolls for these plastics sheets are provided at the other end so as to prevent the material adhering to the endless belts. The body is formed in the converging part of the run between the belts, and the downstream parallel parts of the run are chilled to cool the thus formed body.

The solid materials of the invention which thus comprise encapsulated polystyrene beads compressed together comprise a weather resistant insulating board which is able to withstand continuous rainfall without taking up moisture and thus retaining its thermal efficiency as an insulator. Moreover, the preferred use of a high softening point bitumen which is solid at ambient temperature means that there is no fear of failure in the construction of the material in hot weather or hot climates. As a result the material can be installed as a thermal insulation for instance for flat roofs and it can be installed above the normal roof waterproofing layer. This allows the waterproofing layer itself to be installed at its most effective position which is directly onto the roof deck and it also provides protection for the waterproofing layer against extremes of temperature and ultraviolet light so that the life of that layer is itself extended significantly. In addition, of course, the material of the invention provides exceedingly favourable insulation properties in a strong, easy to handle, form.

I claim:

1. An insulating material comprising expanded plastics beads which are each encapsulated in bitumen or a bituminous compound which has a softening point more than 10° C. higher than the melting point of the beads and is free from solvents, light oils, emulsifiers or other liquifying agents, such encapsulation having been formed with the bitumen or bituminous compound in liquid form in a hot process, the beads having been expanded prior to processing with the bitumen or bituminous compound.

2. A material according to claim 1, wherein the encapsulated beads are free-flowing, the bitumen or bituminous compound being solid at ambient temperature.

3. An insulating material in the form of a body comprising expanded plastics beads which are each encapsulated in bitumen or a bituminous compound which has a softening point more than 10° C. higher than the melting point of the beads and is free from solvents, light oils, emulsifiers or other liquifying agents, such encapsulation having been formed with the bitumen or bituminous compound in liquid form in a hot process, the encapsulated beads having been expanded prior to processing with the bitumen or bituminous compound and, subsequent to this processing, pressed together and distorted to form a body with voids between the heads substantially eliminated.

4. A material according to claim 3, wherein the bitumen or bituminous compound is solid at ambient temperature.

5. A material according to claim 3, wherein the beads are so distorted from spherical form as to interlock with and have substantially straight edges between one another.

6. A material according to claim 3, which has a flexural strength of 2.10–3.15 kg/cm$^2$ and a compressive strength of 1.05–1.75 kg/cm$^2$ at 25° C. and 20% compression.

7. A material according to claim 3, wherein the diameter of the smallest beads is not less than one fifth of the diameter of the largest beads, and the beads are between 2 and 10 mm in size.

8. A material according to claim 3, wherein the beads are generally of uniform size, and between 2 and 10 mm in size.

9. A material according to claim 3, wherein the bitumen or bituminous compound is an asphalt with a softening point of 115° C. or more (Institute of Petroleum Needle Method) and a penetration value of 1 to 6 at a conditioned temperature of 25° C.

10. A material according to claim 3, wherein the beads are of polystyrene.

11. A material according to claim 3, wherein the volume ratio of beads to bitumen or bituminous composition is from 25 to 1 to 40 to 1.

12. A method of making an insulating material which comprises heating bitumen or a bituminous compound which is free from solvents, light oils, emulsifiers or other liquifying agents to a temperature appreciably above its softening point in order to make it liquid and free running and processing expanded plastics beads therewith so as to completely encapsulate each of the beads, the bitumen or bituminous compound having a softening point which is more than 10° C. higher than the melting point of the beads.

13. A method according to claim 12, wherein the bitumen or bituminous compound is solid at ambient temperature and the beads are separated one from another once coated so as to be free-flowing.

14. A method of making an insulating material body which comprises heating bitumen or a bituminous compound which is free from solvents, light oils, emulsifiers or other liquifying agents to a temperature appreciably above its softening point in order to make it liquid and free running, processing expanded plastics beads therewith so as to completely encapsulate each of the beads, and, while the encapsulating bituminous material is in a semi-liquid state, pressing the encapsulated beads together and distorting them so as substantially to eliminate voids between the beads, the bitumen or bituminous compound having a softening point which is more than 10° C. higher than the melting point of the beads.

15. A method according to claim 14, wherein the beads are cooled after coating, separated from each other, reheated to provide the encapsulating bituminous material in the semi-liquid state, and pressed together.

16. A method according to claim 14, wherein the beads are further expanded or re-expanded while being pressed together so as to be urged against one another and interlock with and have substantially straight edges between one another.

17. A method according to claim 16, wherein the further expansion is brought about by the injection amongst the beads of superheated steam at from 150° C. to 180° C.

18. A method according to claim 14, wherein the initial volume ratio of beads to bitumen is between 25 and 30 to 1 and the final volume ratio is approximately 40 to 1.

19. A method according to claim 14, wherein the diameter of the smallest beads is not less than one fifth of the diameter of the largest beads, and the beads are between 2 and 10 mm in size.

20. A method according to claim 19, wherein the beads are generally of uniform size, and the beads are between 2 and 10 mm in size.

21. A method according to claim 14, wherein the bitumen or bituminous compound is an asphalt with a softening point of 115° C. or more (Institute of Petroleum Needle Method) and a penetration value of 1 to 6 at a conditioned temperature of 25° C.

22. A method according to claim 14, wherein the beads are of polystyrene.

* * * * *